United States Patent
Banerjee et al.

(10) Patent No.: US 10,036,335 B2
(45) Date of Patent: Jul. 31, 2018

(54) SYSTEMS AND METHODS FOR DIAGNOSING AN ENGINE

(75) Inventors: Arijit Banerjee, Kolkata (IN); Ajith Kuttainnair Kumar, Erie, PA (US); Arvind Kumar Tiwari, Bangalore (IN); Rupam Mukherjee, Bangalore (IN); Somakumar Ramachandrapanicker, Bangalore (IN); Paul Lloyd Flynn, Erie, PA (US); Boyanapally Srilatha, Bangalore (IN)

(73) Assignee: General Electric Company, Schenectady, NY (US)

( * ) Notice: Subject to any disclaimer, the term of this patent is extended or adjusted under 35 U.S.C. 154(b) by 1174 days.

(21) Appl. No.: 13/234,881

(22) Filed: Sep. 16, 2011

(65) Prior Publication Data

US 2013/0073175 A1    Mar. 21, 2013

Related U.S. Application Data

(60) Provisional application No. 61/535,049, filed on Sep. 15, 2011.

(51) Int. Cl.
*F02D 29/06* (2006.01)
*F02D 41/00* (2006.01)
(Continued)

(52) U.S. Cl.
CPC ............... *F02D 29/06* (2013.01); *B60K 6/46* (2013.01); *B60W 20/50* (2013.01); *F02D 41/0097* (2013.01); *F02D 41/1498* (2013.01); *F02D 41/22* (2013.01); *F02D 41/221* (2013.01); *B60W 2030/206* (2013.01); *F02D 2041/288* (2013.01);
(Continued)

(58) Field of Classification Search
CPC ............... B60K 6/46; Y02T 10/6217; B60W 2030/206; B60W 20/50; F02D 2041/288; F02D 2200/1004; F02D 2200/1006; F02D 2200/101; F02D 2200/1012;
(Continued)

(56) References Cited

U.S. PATENT DOCUMENTS

| 3,877,003 A | 4/1975 | Kawashima et al. |
| 4,334,427 A | 6/1982 | Armstrong |

(Continued)

FOREIGN PATENT DOCUMENTS

| AT | 9466 U1 | 10/2007 |
| CN | 1439102 A | 8/2003 |

(Continued)

OTHER PUBLICATIONS

U.S. Appl. No. 13/047,200, filed Mar. 14, 2011.
(Continued)

*Primary Examiner* — Sizo Vilakazi
(74) *Attorney, Agent, or Firm* — GE Global Patent Operation; John A. Kramer

(57) ABSTRACT

Methods and systems are provided for an engine. A condition of the engine may be diagnosed based on information provided by signals from a generator operationally connected to the engine and/or other signals associated with the engine. Different types of degradation may be distinguished based on discerning characteristics within the information. Thus, a degraded engine component may be identified in a manner that reduces service induced delay.

12 Claims, 8 Drawing Sheets

(51) Int. Cl.
*F02D 41/14* (2006.01)
*F02D 41/22* (2006.01)
*B60K 6/46* (2007.10)
*B60W 20/50* (2016.01)
*F02D 41/28* (2006.01)
*B60W 30/20* (2006.01)

(52) U.S. Cl.
CPC ............... *F02D 2200/101* (2013.01); *F02D 2200/1004* (2013.01); *F02D 2200/1006* (2013.01); *F02D 2200/1012* (2013.01); *F02D 2250/24* (2013.01); *Y02T 10/6217* (2013.01)

(58) Field of Classification Search
CPC .. F02D 2250/24; F02D 29/06; F02D 41/0097; F02D 41/1498; F02D 41/22; F02D 41/221
USPC ........... 73/114.25; 123/406.26, 679, 687, 123/406.41, 406.42, 406.43, 406.24, 123/406.27, 435; 701/22, 29.1, 29.4, 701/29.5, 29.6, 30.2, 30.5, 30.6, 30.7, 701/34.3, 34.4, 32.9, 33.7, 99, 101, 102, 701/114
See application file for complete search history.

(56) References Cited

U.S. PATENT DOCUMENTS

| | | | |
|---|---|---|---|
| 5,056,487 A | 10/1991 | Yamakado et al. | |
| 5,216,915 A | 6/1993 | Sakamoto | |
| 5,383,107 A | 1/1995 | Hopkins et al. | |
| 5,461,289 A * | 10/1995 | Adler ................... | B60K 6/46 180/65.245 |
| 5,509,302 A | 4/1996 | Drexel et al. | |
| 5,524,480 A | 6/1996 | Schlienz et al. | |
| 5,592,388 A | 1/1997 | Bradshaw et al. | |
| 5,711,272 A | 1/1998 | Maegawa et al. | |
| 5,728,941 A | 3/1998 | Yamamoto et al. | |
| 5,860,800 A | 1/1999 | Kramer et al. | |
| 6,021,758 A | 2/2000 | Carey et al. | |
| 6,023,651 A | 2/2000 | Nakayama et al. | |
| 6,427,656 B1 | 8/2002 | Drecq et al. | |
| 6,490,511 B1 | 12/2002 | Raftari et al. | |
| 6,510,731 B2 | 1/2003 | Schricker et al. | |
| 6,658,346 B2 | 12/2003 | Maegawa | |
| 6,968,268 B2 | 11/2005 | Yamada et al. | |
| 7,133,766 B2 | 11/2006 | Kokubo | |
| 7,197,916 B2 | 4/2007 | Matsumoto et al. | |
| 7,530,261 B2 | 5/2009 | Walters | |
| 7,669,559 B2 | 3/2010 | Aoyama et al. | |
| 7,761,223 B2 | 7/2010 | Wang et al. | |
| 2001/0054890 A1 | 12/2001 | Thibedeau et al. | |
| 2002/0050271 A1 | 5/2002 | Hasegawa et al. | |
| 2002/0148441 A1 | 10/2002 | Tuken | |
| 2003/0089338 A1 | 5/2003 | Remele et al. | |
| 2003/0191581 A1 | 10/2003 | Ukai et al. | |
| 2004/0148926 A1 | 8/2004 | Morinaga et al. | |
| 2004/0199348 A1 | 10/2004 | Hitchcock et al. | |
| 2005/0204805 A1 | 9/2005 | Wakahara et al. | |
| 2005/0229904 A1 | 10/2005 | Hagel et al. | |
| 2006/0021807 A1* | 2/2006 | Andersen ............... | B60K 6/365 180/65.225 |
| 2006/0047408 A1* | 3/2006 | Kayser .................... | F02D 29/06 701/114 |
| 2007/0250288 A1 | 10/2007 | Maier-Landgrebe | |
| 2008/0296896 A1 | 12/2008 | Spenceley et al. | |
| 2008/0303459 A1 | 12/2008 | Furukawa et al. | |
| 2009/0025992 A1 | 1/2009 | Hayashi et al. | |
| 2009/0120174 A1 | 5/2009 | Nadera et al. | |
| 2009/0139781 A1 | 6/2009 | Straubel | |
| 2009/0229355 A1 | 9/2009 | Shoda | |
| 2010/0066097 A1 | 3/2010 | Verdejo et al. | |
| 2010/0131172 A1 | 5/2010 | Willi et al. | |
| 2010/0162797 A1 | 7/2010 | Summers et al. | |
| 2010/0207634 A1 | 8/2010 | Wang | |
| 2010/0211296 A1 | 8/2010 | Saunders | |
| 2011/0153128 A1* | 6/2011 | Wright .................. | B60L 11/005 701/22 |
| 2011/0273148 A1* | 11/2011 | Ueno .................... | B60L 11/123 322/28 |
| 2012/0059544 A1 | 3/2012 | Kinoshita et al. | |
| 2012/0123709 A1 | 5/2012 | Chen et al. | |
| 2012/0239348 A1 | 9/2012 | Banerjee et al. | |
| 2012/0303259 A1 | 11/2012 | Prosser | |
| 2013/0020993 A1 | 1/2013 | Taddeo et al. | |
| 2013/0068003 A1* | 3/2013 | Kumar .................... | F02D 41/22 73/114.25 |
| 2013/0073126 A1 | 3/2013 | Kumar et al. | |
| 2013/0073127 A1 | 3/2013 | Kumar et al. | |
| 2013/0300334 A1 | 11/2013 | Tooyama et al. | |
| 2015/0355054 A1 | 12/2015 | Kumar et al. | |

FOREIGN PATENT DOCUMENTS

| | | |
|---|---|---|
| CN | 101266197 A | 9/2008 |
| CN | 101389517 A | 3/2009 |
| DE | 10001487 A1 | 8/2001 |
| DE | 102006012858 A1 | 9/2007 |
| DE | 102008050287 A1 | 4/2009 |
| DE | 102009051624 A1 | 2/2011 |
| EP | 0522849 A1 | 7/1991 |
| EP | 1143134 A1 | 10/2001 |
| GB | 1350276 A | 4/1974 |
| JE | 102008032174 A1 | 7/2009 |
| JP | 0285346 U | 7/1990 |
| JP | 04317600 A | 11/1992 |
| JP | 05500418 A | 1/1993 |
| JP | 0847107 A | 2/1996 |
| JP | 08182395 A | 7/1996 |
| JP | 09151779 A | 6/1997 |
| JP | 1062470 A | 3/1998 |
| JP | 10198420 A | 7/1998 |
| JP | 2000352332 A | 12/2000 |
| JP | 2001076012 A | 3/2001 |
| JP | 2001098999 A * | 4/2001 |
| JP | 2003065142 A | 3/2003 |
| JP | 2004251178 A | 9/2004 |
| JP | 2005061487 A | 3/2005 |
| JP | 2005304267 A | 10/2005 |
| JP | 2006254628 A | 9/2006 |
| JP | 2007071191 A | 3/2007 |
| JP | 2008050985 A | 3/2008 |
| JP | 2010074887 A | 4/2010 |
| WO | 9419670 A1 | 9/1994 |
| WO | 2008050552 A1 | 5/2008 |

OTHER PUBLICATIONS

Search Report from corresponding PCT Application No. PCT/US2012/053462 dated Dec. 11, 2012.

Park et al., "Spectral Analysis of DC Link Ripple Currents in Three-Phase AC/DC/AC PWM Converters Feeding AC Machines", 27th Annual Conference of the IEEE Industrial Electronics Society, pp. 1055-1060, 2001.

Thomson et al., "Current and Vibration Monitoring for Fault Diagnosis and Root Cause Analysis of Induction Motor Drives", Proceedings of the Thirty-First Turbomachinery Symposium, pp. 61-68, 2002.

Kubota et al., "Compensation of pole Position Estimation Error for Sensor -Less IPMSM Drives with DC Link Current Detection", IEEE, PEDS, pp. 17-21, 2007.

Kobayashi et al., "Investigation of IPMSM's Position Estimation in Low Speed Region with DC Link Current Detection", IEEE, pp. 1411-1416, 2007.

Bodkhe et al., "A Variable-Speed, Sensorless, Induction Motor Drive Using DC Link Measurements", IEEE ICIEA, pp. 3591-3596, 2009.

PCT Invitation to Pay Additional Fees issued in connection with related Application No. PCT/US2012/053499 on Dec. 12, 2012.

(56) References Cited

OTHER PUBLICATIONS

PCT Invitation to Pay Additional Fees issued in connection with related Application No. PCT/US2012/053495 on Dec. 8, 2012.
PCT Search Report and Written Opinion issued in connection with related Application No. PCT/US2012/053499 on Jan. 23, 2013.
US Non-Final Office Action issued in connection with related U.S. Appl. No. 13/234,411 on Feb. 11, 2013.
PCT Search Report and Written Opinion issued in connection with related Application No. PCT/US2012/053495 on Mar. 5, 2013.
US Final Office Action issued in connection with related U.S. Appl. No. 13/234,411 on May 30, 2013.
US Non-Final Office Action issued in connection with related U.S. Appl. No. 13/234,380 on Jul. 2, 2013.
US Non-Final Office Action issued in connection with related U.S. Appl. No. 13/234,460 on Jul. 17, 2013.
US Notice of Allowance Office Action issued in connection with related U.S. Appl. No. 13/234,380 on Sep. 6, 2013.
US Notice of Allowance Office Action issued in connection with related U.S. Appl. No. 13/234,460 on Sep. 24, 2013.
Unofficial English Translation of Chinese Office Action issued in connection with related CN Application No. 201280044851.5 on Sep. 6, 2015.
Unofficial English Translation of Chinese Office Action issued in connection with related CN Application No. 201280044849.8 on Sep. 22, 2015.
Australian Office Action issued in connection with related AU Application No. 2012308955 on Feb. 9, 2016.
Unofficial English Translation of Chinese Office Action issued in connection with related CN Application No. 201280044851.5 on Apr. 27, 2016.
Australian Office Action issued in connection with related AU Application No. 2012308952 on May 10, 2016.
Unofficial English Translation of Japanese Office Action issued in connection with related JP Application No. 2014530692 on May 31, 2016.
US Non-Final Office Action issued in connection with related U.S. Appl. No. 14/211,313 on Jul. 13, 2016.
Unofficial English Translation of Japanese Office Action issued in connection with Corresponding JP Application No. 2014530691 dated Oct. 4, 2016.
Unofficial English Translation of Japanese Search Report issued in connection with Corresponding JP Application No. 2014530691 dated Dec. 9, 2016.
Machine translation of Japanese Office Action issued in connection with corresponding JP Application No. 2014530691 dated May 16, 2017.

* cited by examiner

SYSTEMS AND METHODS FOR DIAGNOSING AN ENGINE

This application claims the benefit of U.S. provisional patent application Ser. No. 61/535,049, filed on Sep. 15, 2011, which is hereby incorporated by reference in its entirety.

FIELD

Embodiments of the subject matter disclosed herein relate to systems and methods for diagnosing an engine.

BACKGROUND

Engine components may degrade during operation in various ways. For example, an engine cylinder in an engine may start mis-firing due to a worn out ignition plug. One approach to detect engine degradation is to monitor engine speed. Diagnostic routines can monitor whether components of the engine speed rise above a threshold level and generate diagnostic codes or other indications requesting service, de-rating engine power, or shutting down the engine. However, the inventors herein have recognized that analysis of engine speed is often inadequate to thoroughly diagnose an engine problem.

BRIEF DESCRIPTION

In one embodiment, a method for an engine operationally connected to a generator is provided. The method includes measuring at least one parameter associated with the generator during operation, determining a torque profile associated with the generator based on the measured parameter, and diagnosing a condition of the engine based on frequency content of the determined torque profile.

In one embodiment, a method for an engine operationally connected to a generator is provided. The method includes measuring at least one parameter associated with the generator during operation, determining a torque profile associated with the generator based on the measured parameter, and distinguishing between different types of degradation of the engine based on frequency content of the determined torque profile.

In one embodiment, a vehicle system is provided. The vehicle system includes an engine, a generator operatively connected to the engine, at least one sensor for measuring at least one parameter associated with the generator during operation, and a controller. The controller includes instructions configured to sample and transform the measured parameter to a torque profile, identify frequency content of the torque profile, and diagnose a condition of the engine based on the frequency content of the torque profile.

In one embodiment, a test kit is provided. The test kit includes a controller that is operable to determine a condition of an engine based on frequency content of a torque profile derived from parameter measurements of a generator operatively connected to the engine.

In one embodiment, a method for an engine operatively connected to a generator is provided. The method includes measuring an electrical parameter associated with the generator during operation and diagnosing a condition of the engine based on frequency content of the measured electrical parameter.

In one embodiment, a vehicle system is provided. The vehicle system includes an engine, a generator operatively connected to the engine, a sensor for measuring an electrical parameter associated with the generator during operation, and a controller. The controller includes instructions configured to sample the measured electrical parameter, identify frequency content of the measured electrical parameter, and diagnose a condition of the engine based on the frequency content of the measured electrical parameter.

In one embodiment, a test kit is provided. The test kit includes a controller that is operable to determine a condition of an engine based on a frequency content of an electrical parameter profile associated with a generator operatively connected to the engine.

In one embodiment a method for an engine operationally connected to a generator is provided. The method includes measuring an electrical parameter associated with the generator during operation over time, determining frequency content of the measured electrical parameter, and reconstructing a dc modulation profile from at least a portion of the frequency content, wherein the dc modulation profile is proportional to an electromagnetic torque of the generator.

In one embodiment, a method for an engine operationally connected to a generator is provided. The method includes measuring at least one parameter associated with the engine, measuring at least one parameter associated with the generator, and diagnosing a condition of the engine based on the measured parameters.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to systems and a methods for diagnosing an engine. Test kits for performing the methods are provided, also. The engine may be included in a vehicle, such as a locomotive system. Other suitable types of vehicles may include on-highway vehicles, off-highway vehicles, mining equipment, aircraft, and marine vessels. Other embodiments of the invention may be used for stationary engines such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. These vehicles may include an engine with components that degrade with use.

Furthermore, embodiments of the subject matter disclosed herein use generator data, such as measured generator electrical parameters or generator data (e.g., a derived torque profile) derived from measured generator electrical parameters and/or engine parameters (e.g., speed), to diagnose conditions of an engine or auxiliary equipment and to distinguish between conditions and associated engine components and auxiliary equipment.

An engine may be put in a particular operating condition or mode when looking for particular types of engine degradation. For example, the engine may be diagnosed during a self-loaded condition as part of a test procedure, a dynamic brake (db) setup condition, or a steady state motoring condition. The diagnostic and prognostic methods discussed herein can be used for trending, comparing cylinder-to-cylinder variation, performing test procedures, repair confirmation, and aid in repair. Alternatively, generator and/or engine data may be sampled and analyzed when the engine reaches a particular operating condition or state during normal operation.

Figure 1:
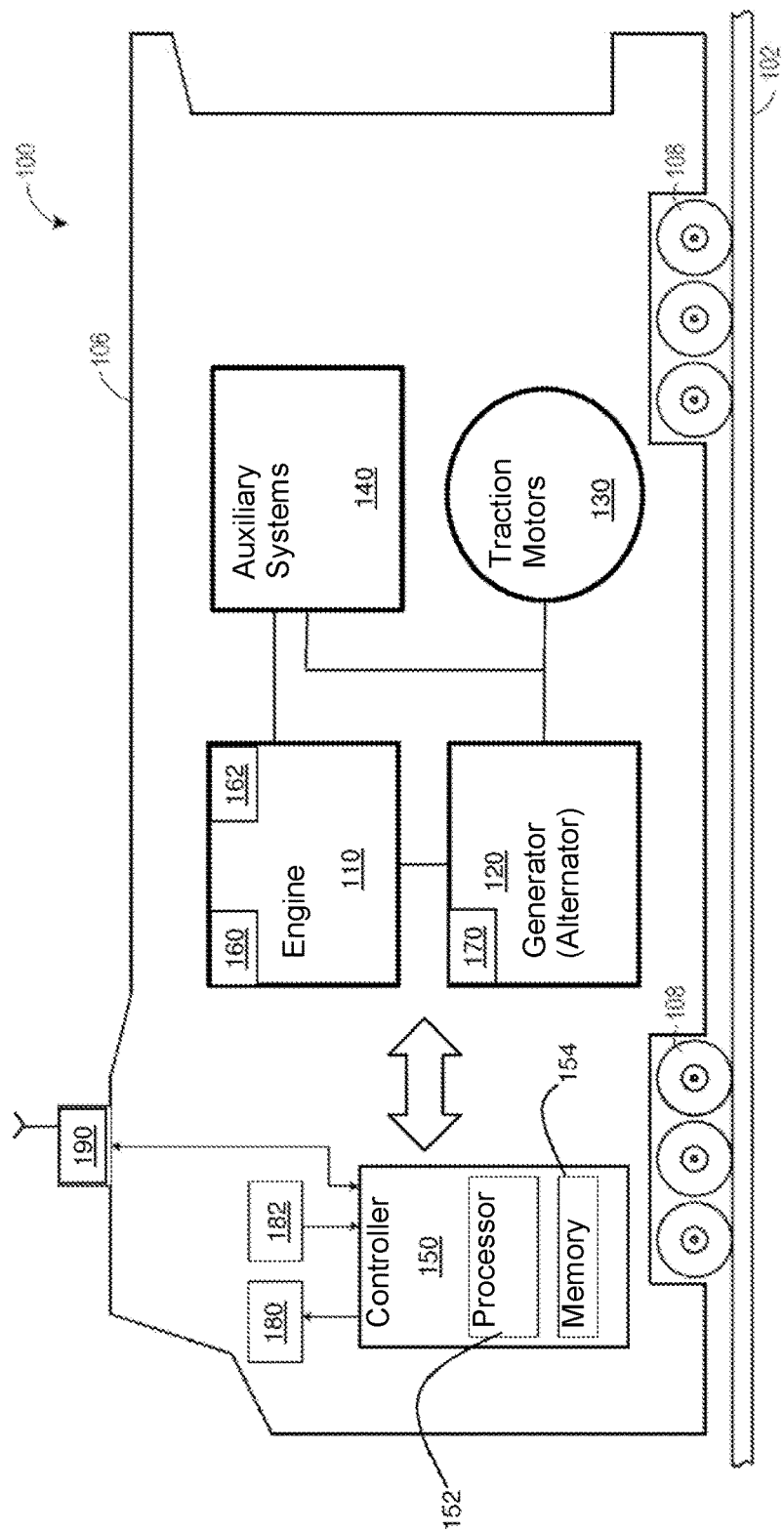
FIG. 1 is an illustration of an example embodiment of a vehicle system (e.g., a locomotive system), having an engine and a generator (alternator), herein depicted as a rail vehicle configured to run on a rail via a plurality of wheels.

FIG. 1 is an illustration of an example embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a generator (alternator) 120. The vehicle 106 also includes traction motors 130 operatively connected to the generator 120 for driving the wheels 108. The vehicle 106 further includes various auxiliary systems or equipment 140 operatively connected to the generator 120 or the engine 110 (e.g., the rotatable engine shaft 111, see FIG. 2) for performing various functions.

The vehicle 106 further includes a controller 150 to control various components related to the vehicle system 100. In one example, controller 150 includes a computer control system. In one embodiment, the computer control system is largely software based and includes a processor, such as processor 152, configured to execute computer operable instructions. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware based using, for example, digital signal processors (DSPs) or other hardware logic circuitry to perform the various functions described herein.

The controller may oversee control and management of the vehicle system 100. The controller may receive a signal from a speed sensor 160 of the engine or from various generator sensors 170 to determine operating parameters and operating conditions, and correspondingly adjust various engine actuators 162 to control operation of the rail vehicle 106. In accordance with an embodiment, the speed sensor includes a multi-tooth pick-up wheel connected to the engine shaft 111, and a reluctance sensor for sensing when a tooth of the pick-up wheel passes by the reluctance sensor. For example, the controller may receive signals representing various generator parameters from various generator sensors. The generator parameters can include a dc-link voltage, a dc-link current, a generator field voltage, a generator field current, a generator output voltage, and a generator output current. Other generator parameters may be possible as well, in accordance with various embodiments. Correspondingly, the controller may control the vehicle system by sending commands to various components such as traction motors, alternator, cylinder valves, throttle, etc. Signals from generator sensors 170 may be bundled together into one or more wiring harnesses to reduce space in vehicle system 100 devoted to wiring and to protect the signal wires from abrasion and vibration.

The controller may include onboard electronic diagnostics for recording operational characteristics of the engine. Operational characteristics may include measurements from sensors 160 and 170, for example. In one embodiment, the operational characteristics may be stored in a database in memory 154. In one embodiment, current operational characteristics may be compared to past operational characteristics to determine trends of engine performance.

The controller may include onboard electronic diagnostics for identifying and recording potential degradation and failures of components of vehicle system 100. For example, when a potentially degraded component is identified, a diagnostic code may be stored in memory 154. In one embodiment, a unique diagnostic code may correspond to each type of degradation that may be identified by the controller. For example, a first diagnostic code may indicate a problem with cylinder 1 of the engine, a second diagnostic code may indicate a problem with cylinder 2 of the engine, a third diagnostic code may indicate a problem with one of the auxiliary systems, etc.

The controller may be further linked to display 180, such as a diagnostic interface display, providing a user interface to the locomotive operating crew and a maintenance crew. The controller may control the engine, in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine and auxiliary equipment, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between the vehicle system and a control center of a railroad, another locomotive, a satellite, and/or a wayside device, such as a railroad switch. For example, the controller may estimate geographic coordinates of the vehicle system using signals from a GPS receiver. As another example, the controller may transmit operational characteristics of the engine and/or auxiliary equipment to the control center via a message transmitted from communications system 190. In one embodiment, a message may be transmitted to the command center by communications system 190 when a degraded component of the engine or auxiliary equipment is detected and the vehicle system may be scheduled for maintenance.

Figure 2:
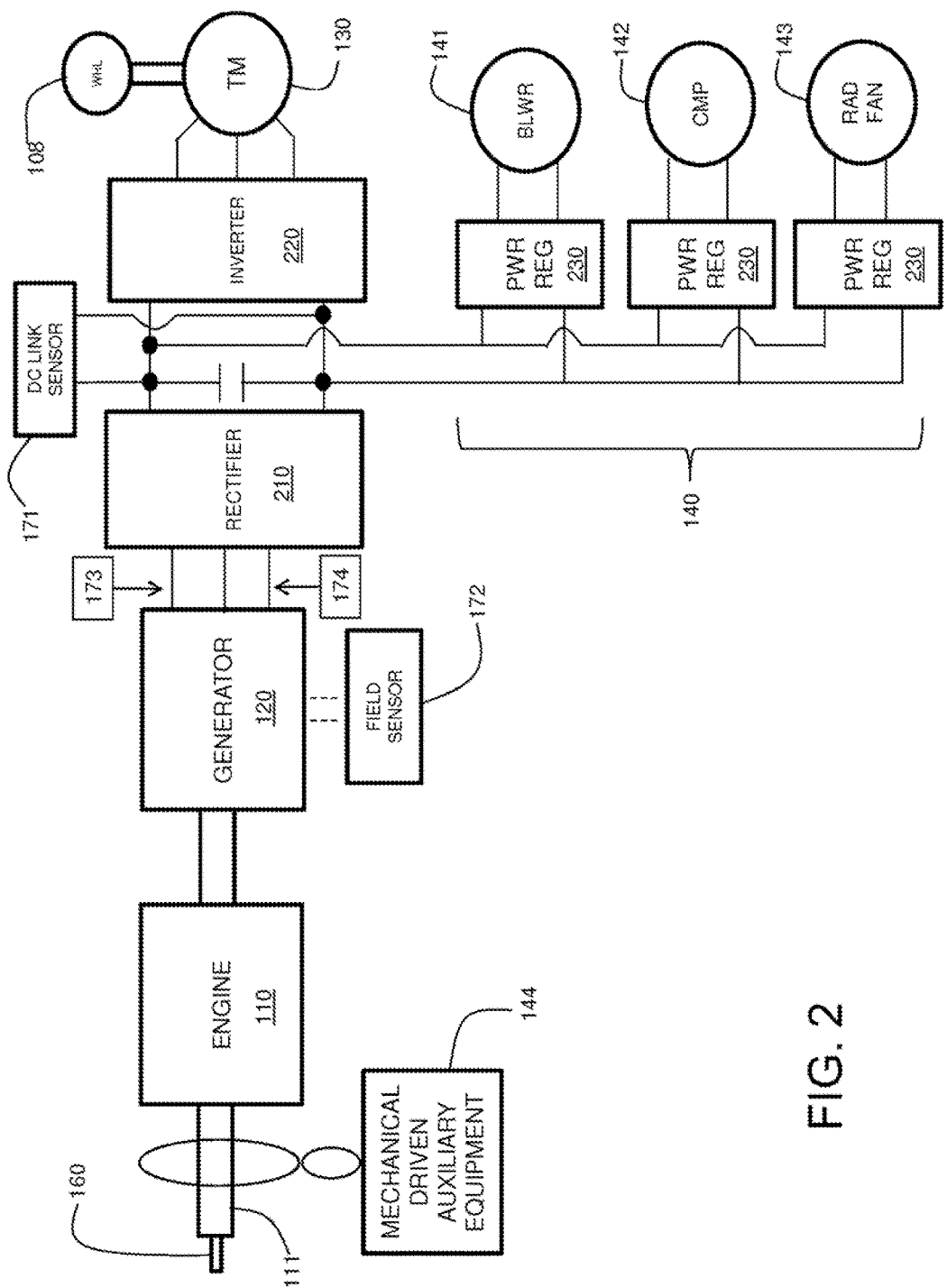
FIG. 2 is an illustration of an example embodiment of the engine and generator of FIG. 1 operatively connected to various auxiliary equipment 140 and traction motors.

FIG. 2 is an illustration of an example embodiment of the engine 110 and generator 120 of FIG. 1 operatively connected to various auxiliary equipment 140 (141, 142, 143, 144) and traction motors 130. Various mechanical auxiliary equipment 144 may be operatively coupled to and driven by the rotating engine shaft 111. Other auxiliary equipment 140 are driven by the generator 120 through a rectifier 210 that produces a dc-link voltage to power regulators 230. Examples of such auxiliary equipment include a blower 141, a compressor 142, and a radiator fan 143. The traction motors 130 are driven by the generator 120 through the rectifier 210 that produces a dc-link voltage to an inverter 220. Such auxiliary equipment 140, traction motors 130, and their implementations are well known in the art. In accordance with certain embodiments, the generator 120 may actually be one or more generators such as, for example, a main generator to drive the traction motors 130 and an auxiliary generator to drive a portion of the auxiliary equipment 140. Further examples of auxiliary equipment include turbochargers, pumps, and engine cooling systems.

The speed sensor 160 measures the speed of the rotating shaft 111 of the engine during operation. The dc-link sensor 171 is a generator sensor and can measure dc-link voltage, dc-link current, or both, in accordance with various embodiments. The field sensor 172 is a generator sensor and can measure field current of the generator, field voltage of the generator, or both, in accordance with various embodiments. In accordance with certain embodiments, generator sensors 173 and 174 are provided for measuring the armature output voltage and current of the generator, respectively. Suitable commercially available sensors may be selected based on application specific parameters.

Figure 3:
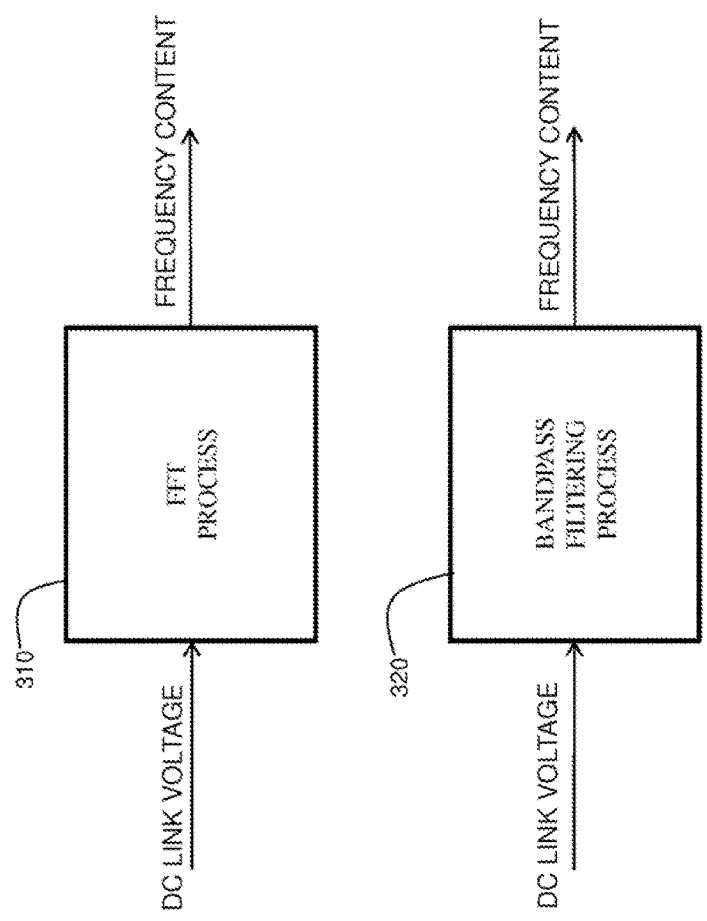
FIG. 3 is an illustration of example embodiments of how to generate frequency content from a time sampled generator parameter.

In accordance with an embodiment, the frequency content of a generator parameter is used to diagnose a condition of the engine. FIG. 3 is an illustration of embodiments of how to generate frequency content from a time sampled generator parameter. A generator parameter (e.g., the dc-link voltage) is measured using the dc-link sensor 171 and is sent to the controller 150. Other generator parameters may be used instead, including the dc-link current, the generator field voltage, the generator field current, the generator output voltage, and the generator output current. The controller 150 samples the generator parameter over time and performs a frequency analysis process on the generator parameter data. In accordance with one embodiment, the frequency analysis process is a Fourier transform process 310 (e.g., a Fast Fourier Transform, FFT, process). In accordance with another embodiment, the frequency analysis process is a bandpass filtering process 320. The frequency analysis process transforms the sampled time domain generator parameter into frequency content in the frequency domain. The various frequency components of the frequency content can include fundamental (first order) and harmonic (second order, half order, third order, etc.) frequency components. In accordance with an embodiment, the Fourier Transform process and the bandpass filtering process include computer executable instructions that are executed by the processor 152. The frequency transformation can be performed on processed/derived signals such as, for example, kilovolt-amps (kVA) or kilowatts (kW) which are the product of current and voltage, or torque which is kW/frequency of the signal.

For example, the engine may have a plurality of cylinders that fire in a predefined sequence, where each cylinder fires once during a four stroke or a two stroke cycle. For example, a four cylinder, four stroke engine may have a firing sequence of 1-3-4-2, where each cylinder fires once for every two revolutions of the engine. Thus, the firing frequency of a given cylinder is one half the frequency of revolution of the engine and the firing frequency of any cylinder is twice the frequency of revolution of the engine. The frequency of revolution of the engine may be described as the first engine order. Such a first order frequency component can show up in the frequency content of the measured generator parameter. The firing frequency of a given cylinder of a four stroke engine may be described as the half engine order, where the half engine order is one half the frequency of revolution of the engine. Such a half order frequency component can also show up in the frequency content of the measured generator parameter.

As another example of a four stroke engine, a twelve cylinder engine may have a firing sequence of 1-7-5-11-3-9-6-12-2-8-4-10, where each cylinder fires once for every two revolutions of the engine. Thus, the firing frequency of a given cylinder is one half the frequency of revolution of the engine and the firing frequency of any cylinder is six times the frequency of revolution of the engine. As an example of a two stroke engine, a twelve cylinder engine may have a firing sequence of 1-7-5-11-3-9-6-12-2-8-4-10, where each cylinder fires once for every revolution of the engine. Thus, the firing frequency of a given cylinder is the frequency of revolution of the engine and the firing frequency of any cylinder is twelve times the frequency of revolution of the engine. Again, these frequency components can show up in the frequency content of the measured generator parameter.

For example, the engine may be a four stroke engine operating at 1050 RPM. Thus, the first engine order is at 17.5 Hz and the half engine order is at 8.75 Hz. The dc-link voltage may vary with a periodic frequency as the engine shaft 111 rotates during operation. For example, the frequency content of the dc-link voltage may include a frequency component at the frequency of the first engine order. In other words, the peak magnitude of the frequency content may occur at the first-order frequency component. The dc-link voltage may also include frequency content at other harmonics of the first-order frequency, such as at a second-order frequency (twice the engine frequency), a third-order frequency (three times the engine frequency), etc. Similarly, the dc-link voltage may include frequency content at frequencies less than the first-order frequency, such as at a half-order frequency (half the engine frequency).

For an engine that is "healthy" and is operating properly, the frequency content of the measured generator parameter can have a particular healthy signature. Deviations from such a healthy signature can indicate a problem with the engine. For example, in accordance with an embodiment, a condition of an engine may be diagnosed by analyzing a half order magnitude and/or phase of the frequency content.

Figure 4:
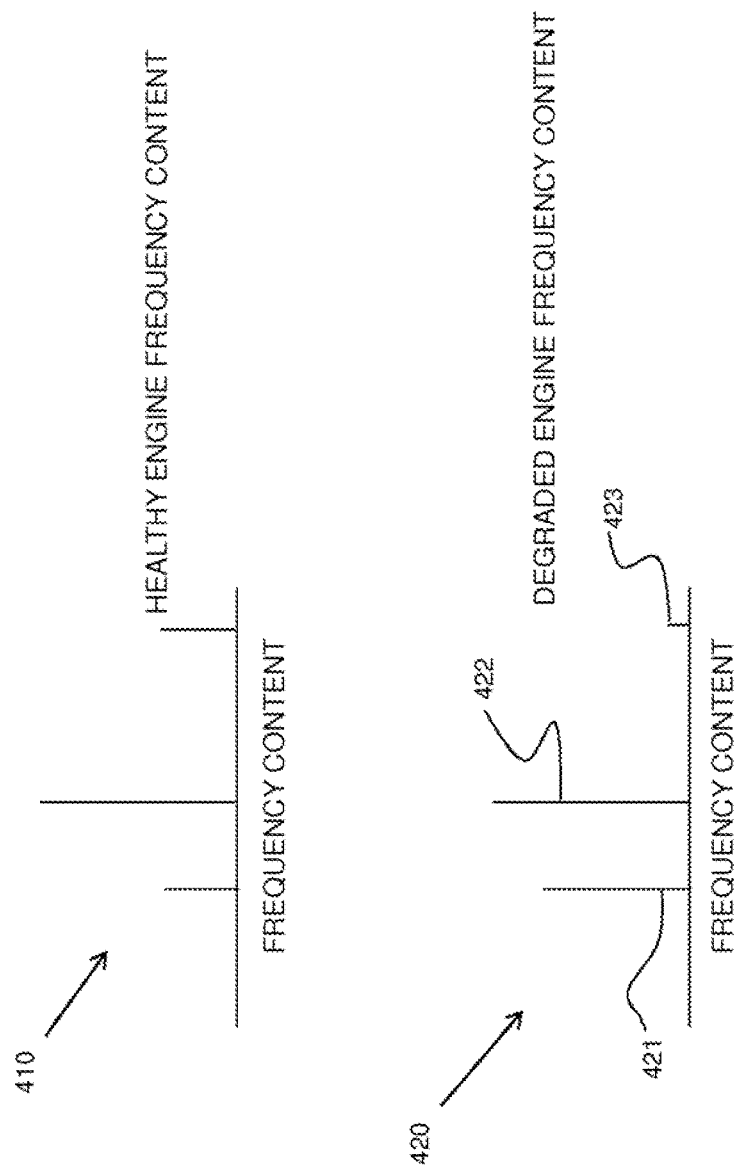
FIG. 4 is an illustration showing example embodiments of "healthy" and "unhealthy" frequency content.

FIG. 4 is an illustration showing example embodiments of "healthy" and "unhealthy" frequency content. The frequency content 410 of the healthy engine (i.e., an engine that is operating properly) has three frequency components of absolute and relative magnitudes as shown in FIG. 4, in accordance with an embodiment. The frequency content 420 of the unhealthy engine (i.e., an engine that is not operating properly due to some degradation or failure) has three frequency components at the same locations as in the frequency content 410 for the healthy engine. However, the amplitude of one frequency component 421 (e.g., a half order component) is distorted (e.g., increased in amplitude), and the amplitude of another frequency component 423

(e.g., a second order component) is also distorted (e.g., decreased in amplitude), in accordance with an embodiment. In one embodiment, the distorted half order component 421 is indicative of an unhealthy engine and is identified by comparing the amplitude of the half order component to a threshold value.

In accordance with another embodiment, both distorted frequency components 421 and 423 in the frequency content 420 are indicative of an unhealthy engine. Furthermore, the particular characteristics of the distorted frequency components (e.g., amplitude) relative to the other frequency components in the frequency content 420 of the unhealthy engine can be indicative of a particular type of engine degradation or failure (e.g., cylinder number 3 of the engine is inoperable). Also, the phase of the half order component, with respect to a reference cylinder (e.g., cylinder number 1), can be used to isolate a problem to a particular cylinder.

The degraded components may cause the engine to operate less efficiently, with less power, and/or with more pollution, for example. Further, the condition of the degraded components may accelerate degradation of the components which may increase the likelihood of catastrophic engine failure and road failure. A degraded engine cylinder is an example of a degraded engine component. Thus, for a four-stroke engine, the distorted frequency component may occur at the half-order frequency. For a two-stroke engine, the distorted frequency component may occur at the first-order frequency. The diagnosis, then, may include both a warning of degradation as well as an indication of the type and/or location of the degraded engine component.

Figure 5:
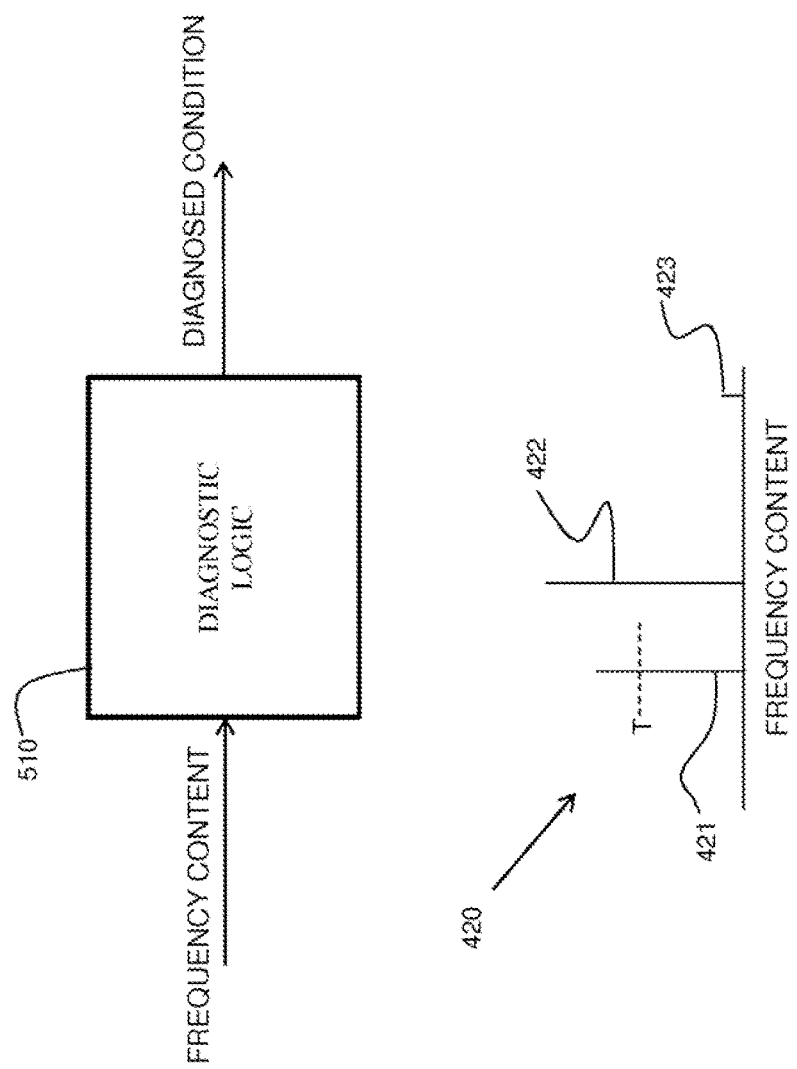
FIG. 5 is an illustration of an example embodiment of how a diagnostic logic in the controller can detect an unhealthy condition in the frequency content of a generator parameter.

FIG. 5 is an illustration of an embodiment of how a diagnostic logic 510 in the controller 150 can detect an unhealthy condition in the frequency content of a generator parameter. For example, the half order component 421 can be compared to a threshold level T by the diagnostic logic 510. If the magnitude of the component 421 exceeds the threshold level T, then the diagnostic logic 510 determines that degradation in the engine has occurred. Furthermore, if the diagnostic logic 510 determines that the ratio of the half order component 421 to the first order component 422 exceeds a second threshold level, and the ratio of the first order component 422 to the second order component 423 exceeds a third threshold level, then the diagnostic logic 510 isolates the degradation to a particular engine component (e.g., cylinder number 3). In accordance with an embodiment, the diagnostic logic includes computer executable instructions that are executed by the processor 152. In accordance with an embodiment, the ratio of a half order component to a dc or zero order component can be indicative of an engine problem. Furthermore, the threshold level T can be dependent on an operating condition of the engine such as, for example, power, speed, ambient conditions, repair history, etc.

Types of engine degradation or failures that can be diagnosed, distinguished, and isolated may include a worn out ignition plug, a fuel imbalance, a faulty cylinder, a knocking in the engine, a low fuel input, a low compression, and a valve train failure, for example. Once a degradation or failure is diagnosed, an action can be taken. Such actions may include, for example, providing a warning signal to the operator (e.g., via the display 180), adjusting an engine operating parameter (e.g., derating the engine power, shutting down at least one cylinder of the engine, shutting down the engine entirely, balancing cylinders of the engine), logging a maintenance action, and transmitting the diagnosed condition to a central location (e.g., via the communications system 190).

Figure 6:
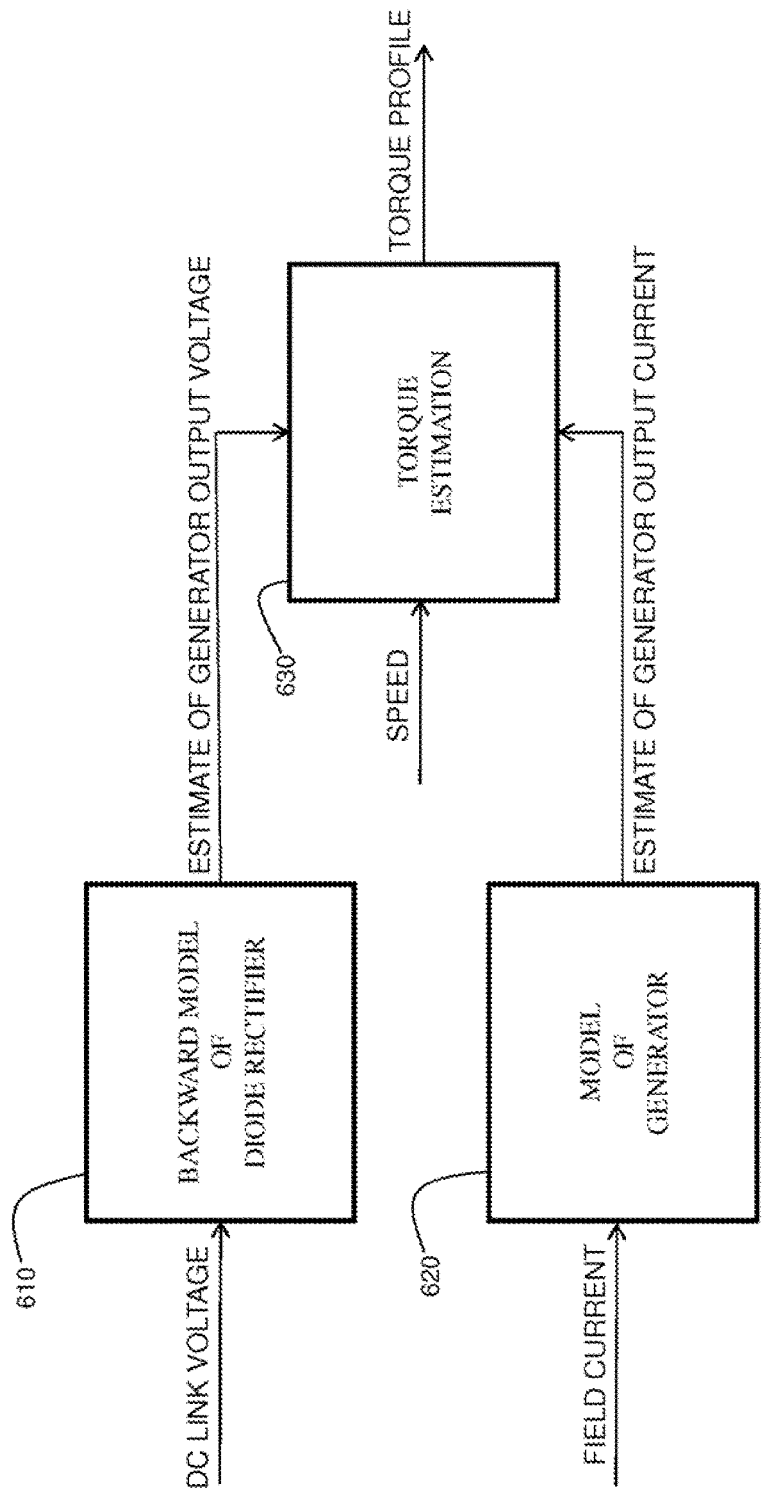
FIG. 6 is an illustration of an example embodiment of how to generate a torque profile from sampled generator parameters.

In accordance with an embodiment, the frequency content of a torque profile associated with the generator is used to diagnose a condition of the engine. FIG. 6 is an illustration of an example embodiment of how to generate a torque profile from sampled generator parameters. The controller 150 includes a backward model 610 of the diode rectifier 210 and a model 620 of the generator 120. The dc-link voltage, as measured by the dc-link sensor 171, is input to the backward model 610 to generate an estimate of the armature (or stator) voltage of the generator (i.e., the generator output voltage). Similarly, the generator field current, as measured by the field sensor 172, is input to the generator model 620 to generate an estimate of the armature (or stator) current of the generator (i.e., the generator output current). The controller 150 further includes a torque estimation model 630. The estimated generator output voltage and current are input to the torque estimation model, along with an indication of speed of the engine, and a torque profile of the generator is generated (e.g., an electromagnetic torque profile). An indication of the speed of the engine is used to tell the torque estimation model 630 where the harmonic frequencies of interest are located. Engine speed from the speed sensor 160 may be used as an input, or frequency content (e.g., the sixth harmonic) out of the rectifier 210 (e.g., frequency content of the dc-link voltage signal) can be used as an indication of speed of the engine.

As a result, a torque profile associated with the generator can be derived from the dc-link voltage and the generator field current. Alternatively, the dc-link current and the generator field voltage could be used with corresponding models to estimate generator output current from the dc-link current and generator output voltage from the generator field voltage. If the generator output voltage and current are already available to the controller 150 (due to such sensors being on the generator), then the backward model 610 and the generator model 620 may be bypassed. Furthermore, if a less accurate estimation of the torque profile is acceptable, just one of the parameters (dc-link voltage, dc-link current, generator field current, generator field voltage, output generator current, output generator voltage) can be used to estimate a torque profile instead of both.

Figure 7:
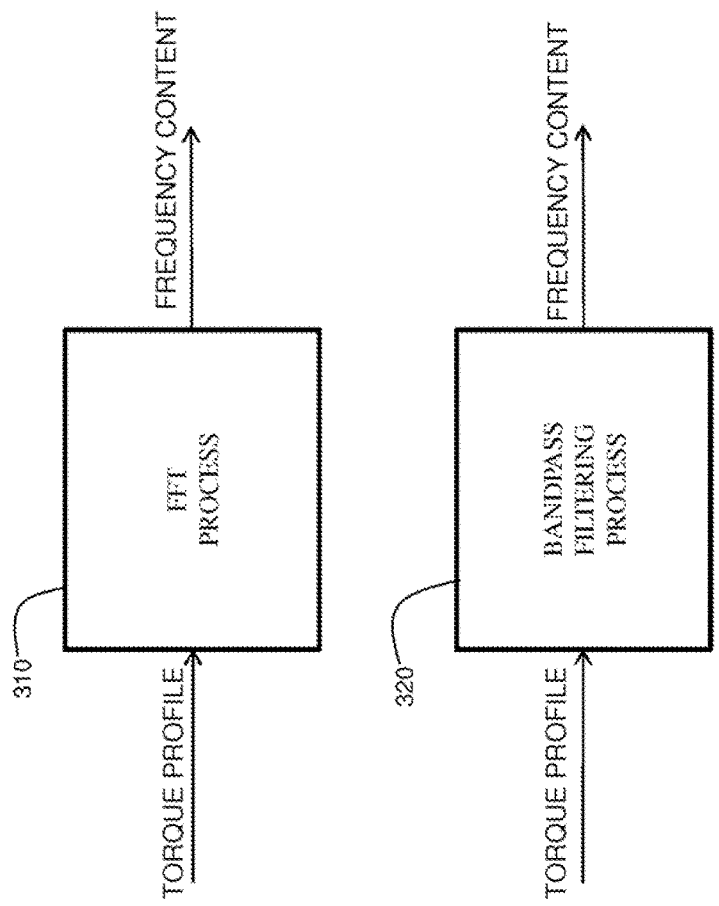
FIG. 7 is an illustration of example embodiments of how to generate frequency content from a time domain torque profile.

A condition of the engine can be diagnosed based on the frequency content of the torque profile. FIG. 7 is an illustration of example embodiments of how to generate frequency content from the time domain torque profile. Again, a Fourier Transform process 310 or a bandpass filtering process 320 of the controller 150 can be used to generate the frequency content. Similarly, as discussed above, the frequency content can be analyzed using the diagnostic logic of the controller 150 to determine degradation of the engine. Various aspects (e.g., amplitude and phase) of the frequency components (e.g., half order, first order, etc.) and/or ratios thereof can be compared to thresholds to determine degradation of an engine component.

Figure 8:
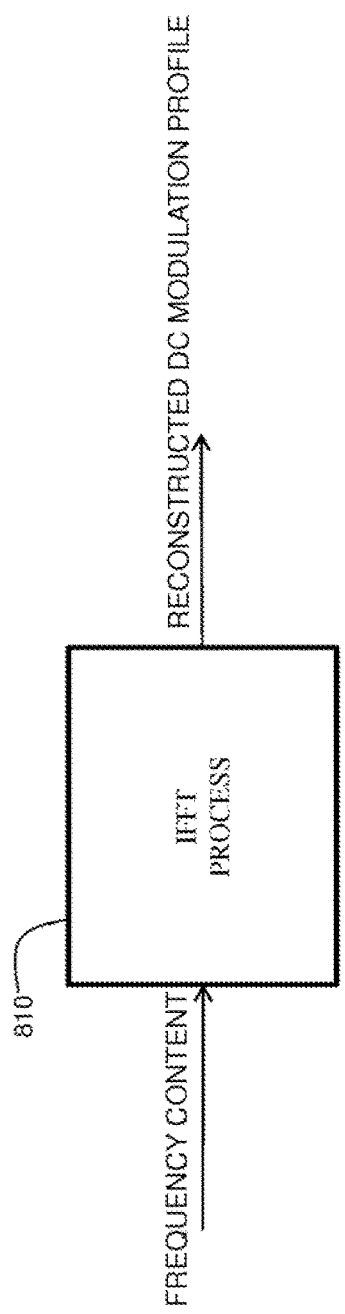
FIG. 8 is an illustration of an example embodiment of how to reconstruct a dc modulation profile from frequency content of a measured electrical parameter of a generator.

In accordance with an embodiment, a dc modulation profile can be reconstructed from at least a portion of the frequency content of measured generator data (e.g., dc-link voltage data). As shown in FIG. 8, an Inverse Fourier Transform process 810 (e.g., an IFFT process) of the controller 150 is used to reconstruct the dc modulation profile from the frequency content. The dc modulation profile is proportional to an electromagnetic torque of the generator. The reconstructed dc modulation profile may be analyzed to diagnose a condition of the engine.

In general, in accordance with various embodiments, a condition of an engine can be diagnosed based on a combination of measured parameters from the engine (e.g., speed or pressure) and the generator (e.g., dc-link voltage, etc.). Frequency content of the various parameters can be determined and compared to diagnose a particular engine condition. Furthermore, other parameter profiles (e.g., torque) can be estimated from the measured parameter profiles and, subsequently, the frequency content of those profiles can be analyzed to diagnose a particular engine condition.

Further examples of applications of systems and methods described herein are now provided. The examples illustrate various approaches for diagnosing and distinguishing between different types of engine degradation based on the frequency content of generator data (e.g., a relatively raw generator parameter such as dc-link voltage, or other derived generator parameters such as electromagnetic torque) associated with the generator, or speed of the engine during engine operation. Many of the examples may apply equally well, with minor adjustments, to various auxiliary equipment.

In one embodiment, a degraded cylinder of a four stroke engine may be detected based on a frequency content signature, such as the magnitude of the half-order frequency component being greater than a half-order threshold value. In an alternate embodiment, the magnitudes of the frequency content may be integrated over the range of frequencies, and a degraded cylinder of a four stroke engine may be detected based on the integration being greater than an integral threshold value.

Detection of one degraded cylinder, where the other cylinders of the engine are more healthy (or less degraded), may have a more clear frequency content signature than when multiple cylinders of the engine are degraded. For example, the frequency content signature of one degraded cylinder may be identified by comparing the magnitude of the half-order frequency component to a half-order magnitude threshold value. However, multiple degraded cylinders may have a different frequency component signature than a single degraded cylinder. Further, the position in the firing order of multiple degraded cylinders may change the frequency content signature. For example, two degraded cylinders 180° out of phase may have a different frequency component signature than two degraded cylinders in successive firing order, and thus the methods disclosed herein may identify one or more degraded cylinders based on various changes in the frequency content signature. Further, it may be beneficial to generate a frequency content signature of a healthy engine by recording frequency content at various frequencies and operating conditions. In one embodiment, the frequency content of the engine may be compared to the frequency content signature of a healthy engine. Anomalies not matching the frequency content signature of the healthy engine or a different degraded engine component may be identified and reported by the controller, for example. Other examples of degraded engine components include a degraded crankcase evacuation system, a degraded turbocharger, and a degraded crankcase.

In one embodiment, the time-domain generator data may be filtered by a low-pass filter with a cut-off frequency slightly greater than the first-order frequency. For example, the cut-off frequency may be ten to twenty percent greater than the first-order frequency. Thus, in one embodiment, the cut-off frequency may be determined by the engine speed. The generator data may be sampled in time at a frequency greater than or equal to the Nyquist rate. In one embodiment, the time-domain signal may be sampled at a frequency greater than twice the first engine order frequency. In one embodiment, the time-domain signal may be sampled at a frequency greater than twice the engine red-line frequency. Thus, by low-pass filtering and sampling at a frequency greater than or equal to the Nyquist rate, the frequency content of the generator data may not be aliased. The same may applied for speed data of the engine.

As discussed herein, the sampled generator data (e.g., dc-link voltage, torque, etc.) may be transformed to generate a frequency domain frequency content. In one embodiment, a fast Fourier transform may be used to generate the frequency domain frequency content. In one embodiment, a correlation algorithm may be applied to compare the frequency content of the generator data, to a signature for a condition of the engine. For example, the signature for a healthy engine may include frequency content at the first-order frequency with a magnitude below a first-order threshold value and frequency content at the half-order frequency with a magnitude below a half-order threshold value. The first-order threshold value may correspond to engine speed, engine load, crankcase temperature, and historical engine data.

For example, the historical engine and generator data may be stored in a database including samples of frequency content from earlier operation of the engine. Thus, a trend in frequency content may be detected and the trend may be used to determine the health of the engine. For example, an increasing magnitude at the half engine order component for a given engine speed and load may indicate that a cylinder is degrading. As another example, an increasing average crankcase pressure coupled without an increasing magnitude at the half engine order component for a given engine speed and load may indicate that the turbocharger or crankcase evacuation system is degrading. A potential fault may include a degraded cylinder, a degraded turbocharger, or a degraded crankcase evacuation system.

In one embodiment, frequency content of the generator data may be stored in a database including historical engine and generator data. For example, the database may be stored in memory 154 of controller 150. As another example, the database may be stored at a site remote from rail vehicle 106. For example, historical data may be encapsulated in a message and transmitted with communications system 190. In this manner, a command center may monitor the health of the engine in real-time. For example, the command center may perform steps to diagnose the condition of the engine using the generator data transmitted with communications system 190. For example, the command center may receive generator data including dc-link voltage data from rail vehicle 106, frequency transform the dc-link voltage data, apply a correlation algorithm to the transformed data, and diagnose potential degradation of the engine. Further, the command center may schedule maintenance and deploy healthy locomotives and maintenance crews in a manner to optimize capital investment. Historical generator data may be further used to evaluate the health of the engine before and after engine service, engine modifications, and engine component change-outs.

In one embodiment, a potential fault may be reported to the locomotive operating crew via display 180. Once notified, the operator may adjust operation of rail vehicle 106 to reduce the potential of further degradation of the engine. In one embodiment, a message indicating a potential fault may be transmitted with communications system 190 to a command center. Further, the severity of the potential fault may be reported. For example, diagnosing a fault based on frequency content of generator data may allow a fault to be detected earlier than when the fault is diagnosed with only average engine information (e.g., only speed information).

Thus, the engine may continue to operate when a potential fault is diagnosed in the early stages of degradation. In contrast, it may be desirable to stop the engine or schedule prompt maintenance if a potential fault is diagnosed as severe. In one embodiment, the severity of a potential fault may be determined according to a difference between a threshold value and the magnitude of one or more components of the frequency content of the generator data.

By analyzing the frequency content of generator data, it may be possible to monitor and diagnose the engine during operation. Further, operation of an engine with a degraded component may be adjusted to potentially reduce additional degradation of the engine component and to potentially reduce the likelihood of additional engine failure and in-use failure. For example, the half-order component may be compared to a half-order threshold value. In one embodiment, if the magnitude of the half-order component is greater than the half-order threshold value, the potential fault may be a degraded cylinder. However, if the magnitude of the half-order component is not greater than the half-order threshold value, the potential fault may be a degraded turbocharger or a degraded crankcase evacuation system.

In one embodiment, the potential fault may be reported to the locomotive operating crew via display 180 and the operator may adjust operation of rail vehicle 106 to reduce the potential of further degradation. In one embodiment, a message diagnosing the potential fault may be transmitted with communications system 190 to a command center.

In one embodiment, an engine operating parameter may be adjusted to identify a degraded cylinder. For example, the degraded cylinder may be identified based on selective disabling of fuel injection to one or more cylinders of the engine. In one embodiment, fuel injection may be disabled for each cylinder of the plurality of cylinders in a sequence while one or more of the generator data and associated frequency content are monitored. For example, fuel injection to one cylinder may be disabled while the other cylinders operate normally. By disabling each cylinder in a sequence, the degraded cylinder may be identified. As another example, fuel injection to a group of cylinders may be disabled while the other cylinders operate normally. By cycling through different groups in a sequence, the degraded cylinder may be identified through a process of elimination.

In one example, the half-order frequency component of the generator data may be monitored for each disabled cylinder of a four stroke engine. The disabled cylinder may be a degraded cylinder when the half-order frequency component drops below a half-order threshold value while the cylinder is disabled. The disabled cylinder may be a healthy cylinder when the half-order frequency component remains above the half-order threshold value while the cylinder is disabled. In other words, the degraded cylinder may be the cylinder that contributes a higher amount of frequency content at the half-order frequency component than other cylinders. In one embodiment, the selective disabling diagnosis may be performed when the engine is operating at idle or lightly loaded.

In one embodiment, the selective disabling diagnosis may be further based on frequency content of engine operating parameters, such as engine speed. For example, the engine speed may include frequency content at the half-order frequency component when a degraded cylinder is operating. Thus, observing frequency content of various engine operating parameters while selectively disabling each cylinder may identify the degraded cylinder.

In one embodiment, the degraded cylinder may be identified based on selectively varying fuel injection to one or more cylinders of the engine. For example, fuel may be selectively increased or decreased to each cylinder while the half-order frequency component of the generator data is monitored. Further, the signature, e.g. the frequency content, of each cylinder may be compared to historical data for the engine or to a healthy engine. For example, the diagnosis test may be performed on a healthy engine to generate a baseline signature. The baseline signature may then be compared to the frequency content while the engine is being diagnosed. In one embodiment, the degraded cylinder may be identified by varying engine fuel injection timing. For example, advance angle adjustments may be used to diagnose the degraded cylinder. For example, engine fuel injection timing may be retarded to potentially increase frequency content of the half-order frequency component.

It may be more desirable to switch off the engine than to have a degraded cylinder fail in a manner that may cause additional damage to the engine. In one embodiment, a threshold value may be determined that indicates continued operation of the engine may be undesirable because the potential fault is severe. For example, the potential fault may be judged as severe if a magnitude of the half-order frequency component exceeds a threshold value. The engine may be stopped if the severity of the potential fault exceeds the threshold value.

A request to schedule service may be sent, such as by a message sent via communications system 190, for example. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the engine, such as by adjusting an engine operating parameter based on the diagnosed condition. It may be determined if derating of the engine is enabled. For example, derating the power of the engine may reduce the magnitude of one or more components of the frequency content of the generator data.

An engine operating parameter may be adjusted, such as to reduce additional degradation of the degraded component, for example. In one embodiment, engine speed or power may be governed. In one embodiment, fuel injection may be reduced or disabled to the potentially degraded cylinder while continuing to operate the other cylinders. Thus, the engine may continue to operate and further degradation of the degraded cylinder may be reduced. In this manner, the engine may be adjusted to potentially reduce additional degradation of the engine component and to potentially reduce the likelihood of catastrophic engine failure and road failure.

In one embodiment, a test kit may be used for identifying frequency content of the generator data and diagnosing a condition of the engine based on the frequency content of the generator data associated with the generator. For example, a test kit may include a controller that is operable to communicate with one or more generator sensors and operable to sample the associated generator data. The controller may be further operable to transform signals from the one or more generator sensors into a frequency content that represents frequency information of the engine. The controller may be further operable to diagnose a condition of the engine based on the frequency content of the generator data from the generator sensor. The test kit may further include one or more sensors for sensing generator parameters (e.g., generator output voltage) and/or engine parameters (e.g., engine speed).

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be". The terms "generator" and "alternator" are used interchangeably herein (however, it is recognized that one term or the other may be more appropriate depending on the application). The terms "frequency content" and "harmonic content" are used interchangeably herein and can refer to fundamental frequency (and/or phase) components and associated harmonic frequency (and/or phase) components above and below the fundamental components. The term "instructions" as used herein with respect to a controller or processor may refer to computer executable instructions. As used herein, the terms "speed", "speed data" and "speed signal" can refer to any of a rotational speed of an engine, harmonic content of a measured engine speed, a difference in a measured speed of an engine from cycle to cycle, a difference in times for an engine to rotate over a determined angle, and a plurality of time intervals, where each time interval corresponds to an amount of time it takes for an engine to rotate over a specified angle.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A method for an engine operationally connected to a generator, comprising:
    disabling fuel injection to each of a plurality of cylinders of the engine in sequence, wherein when fuel injection to one of the plurality of cylinders is disabled, the remaining cylinders of the plurality of cylinders operate normally;
    for each of the plurality of cylinders that is disabled in sequence, respectively measuring an electrical parameter associated with the generator during operation, where auxiliary equipment to be driven by the generator are connected through a rectifier that produces a do-link voltage to at least one power regulator, and where the measuring is performed by one of a dc-link sensor between the rectifier and the at least one power regulator or a field sensor associated with the generator;
    for each of the plurality of cylinders that is disabled in sequence, determining a respective half-order frequency component of a frequency content of the measured electrical parameter; and
    diagnosing a condition of the engine based on the respective half-order frequency component of each of the plurality of cylinders that is disabled in sequence, wherein the condition that is diagnosed comprises an identification of a degraded cylinder of the plurality of cylinders.

2. The method of claim 1, wherein the electrical parameter is one of a dc-link voltage, a dc-link current, a field voltage, or a field current.

3. A vehicle system, comprising:
    an engine having a plurality of cylinders;
    a generator operatively connected to the engine;
    auxiliary equipment to be driven by the generator connected through a rectifier that produces a dc-link voltage to at least one power regulator;
    a sensor for measuring an electrical parameter associated with the generator during operation, where the sensor is one of a DC link sensor between the rectifier and the at least one power regulator or a field sensor associated with the generator; and
    a controller including instructions configured to: disable fuel injection to each of the plurality of cylinders of the engine in sequence, wherein when fuel injection to one of the plurality of cylinders is disabled, the remaining cylinders of the plurality of cylinders operate normally; for each of the plurality of cylinders that is disabled in sequence, respectively sample the measured electrical parameter; for each of the plurality of cylinders that is disabled in sequence, identify respective frequency content of the measured electrical parameter; for each of the plurality of cylinders that is disabled in sequence, determine a respective half-order frequency component of the frequency content of the measured electrical parameter; and diagnose a condition of the engine based on the respective half-order frequency component of each of the plurality of cylinders that is disabled in sequence, wherein the condition that is diagnosed comprises an identification of a degraded cylinder of the plurality of cylinders.

4. The vehicle system of claim 3, wherein the electrical parameter is one of a dc-link voltage, a dc-link current, a field voltage, or a field current.

5. The method of claim 1, wherein the frequency content is combined with engine parameters including at least one of speed, pressure, or torque profile.

6. The method of claim 1, wherein a severity of a potential fault of the condition is determined according to a difference between a threshold value and the magnitude of one or more components of the frequency content.

7. The method of claim 1, wherein the half-order frequency component is determined by a controller having a processor, and the condition is diagnosed by the controller.

8. The method of claim 7, wherein the engine, generator, and controller are affixed to a vehicle.

9. The vehicle system of claim 3, wherein the controller is further configured to use the frequency content to diagnose faults in the generator-driven auxiliary equipment.

10. The method of claim 1, further comprising controlling the engine responsive to identifying the degraded cylinder.

11. A method for an engine operationally connected to a generator, comprising:

varying fuel injection to each of a plurality of cylinders of the engine in sequence, wherein when fuel injection to one cylinder of the plurality of cylinders is varied, at least one of a timing or an amount of the fuel injection to the cylinder is different than a corresponding at least one of a timing or an amount of the fuel injection to the remaining cylinders of the plurality of cylinders;

for each of the plurality of cylinders where fuel injection is varied in sequence, respectively measuring an electrical parameter associated with the generator during operation, where auxiliary equipment to be driven by the generator are connected through a rectifier that produces a dc-link voltage to at least one power regulator, and where the measuring is performed by one of a dc-link sensor between the rectifier and the at least one power regulator or a field sensor associated with the generator;

for each of the plurality of cylinders where fuel injection is varied in sequence, determining a respective half-order frequency component of a frequency content of the measured electrical parameter; and diagnosing a condition of the engine based on the respective half-order frequency component of each of the plurality of cylinders where fuel injection is varied in sequence, wherein the condition that is diagnosed comprises an identification of a degraded cylinder of the plurality of cylinders.

12. The method of claim 11, further comprising controlling the engine responsive to identifying the degraded cylinder.

* * * * *